No. 684,406.  
J. BOIVIN.  
COMBINATION TOOL.  
(Application filed Feb. 16, 1901.)  
Patented Oct. 15, 1901.
(No Model.)
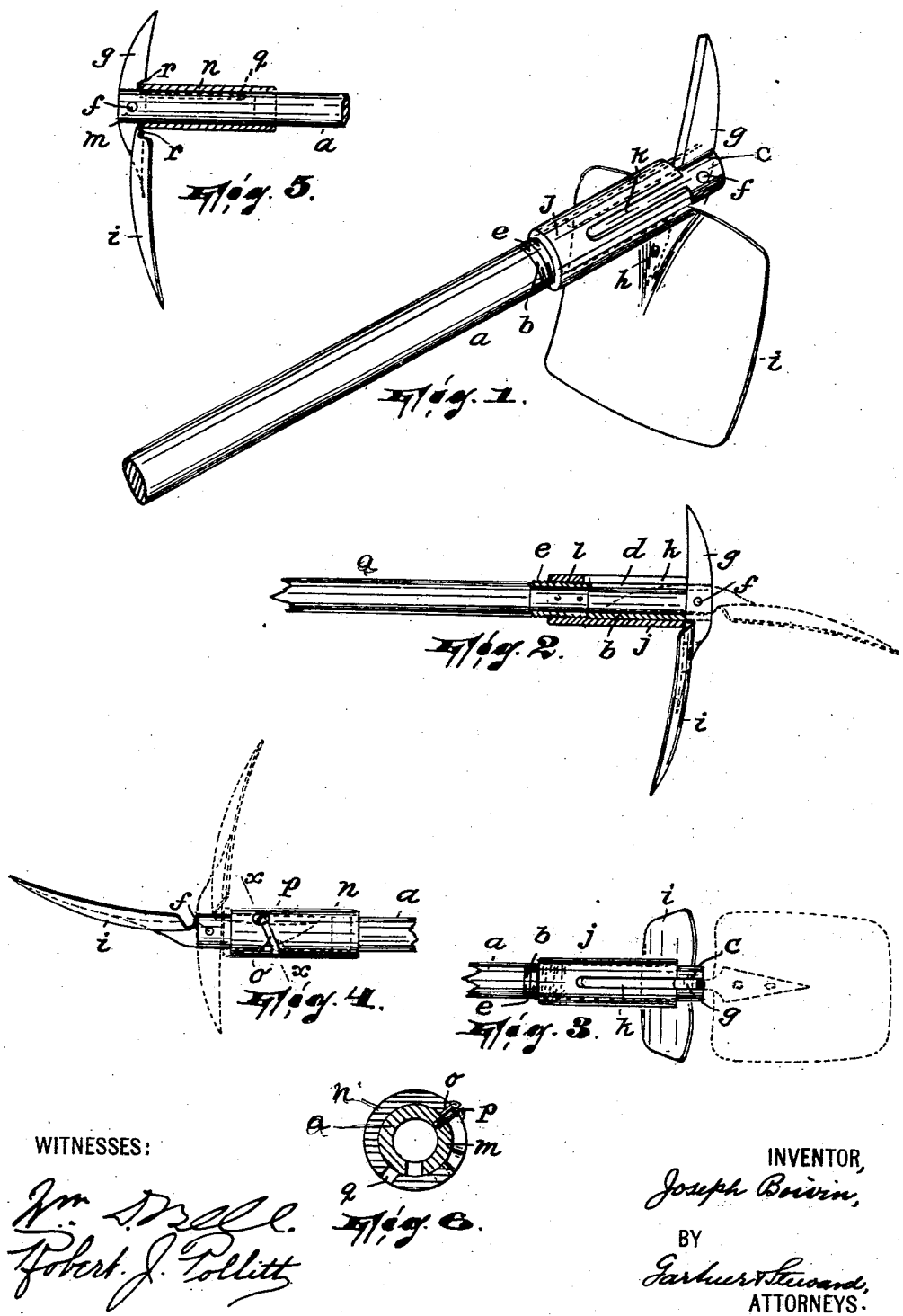
WITNESSES:
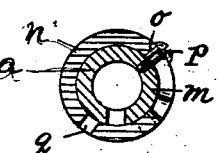
INVENTOR,  
Joseph Boivin,  
BY  
Garhuer & Steward,  
ATTORNEYS.

UNITED STATES PATENT OFFICE.

JOSEPH BOIVIN, OF PATERSON, NEW JERSEY, ASSIGNOR OF ONE-EIGHTH TO JOSEPH GAGNON, OF CHICOUTIMI, CANADA.

COMBINATION-TOOL.

SPECIFICATION forming part of Letters Patent No. 684,406, dated October 15, 1901.

Application filed February 16, 1901. Serial No. 47,539. (No model.)

*To all whom it may concern:*

Be it known that I, JOSEPH BOIVIN, a citizen of the United States, residing in Paterson, in the county of Passaic and State of New Jersey, have invented certain new and useful Improvements in Combination-Tools; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to combination-tools; and it consists in the novel arrangement and combination of parts hereinafter described, and finally embodied in the clauses of the claim, whereby is produced an implement which is readily convertible from a spade or shovel to a pick, and vice versa.

The invention is fully illustrated in the accompanying drawings, wherein corresponding letters of reference indicate like parts in the several figures, and wherein—

Figure 1 is a perspective view of the implement. Fig. 2 is a side view of said implement, certain parts thereof being shown in section. Fig. 3 is a plan view thereof; and Figs. 4, 5, and 6 are views illustrating a modified form of the invention, Fig. 4 being a side view, Fig. 5 likewise a side view, a part, however, being shown in section, and Fig. 6 a sectional view on the line $x\ x$ in Fig. 4.

In said drawings, $a$ designates the handle of the implement, while $b$ is a bifurcated ferrule, which is secured to the end of said handle in some suitable manner. This ferrule has on one side a slot $d$, extending longitudinally thereof from its bifurcation, which is designated by the letter $c$, to approximately the end of the handle, while the portion thereof which immediately incloses the end portion of said handle is externally threaded, as at $e$. In the bifurcated portion $c$ of said ferrule is pivoted, as at $f$, the pick $g$, to one end of which is secured, as by riveting $h$, the spade or shovel $i$. The combined pick and spade or shovel is so arranged in the bifurcated portion of the ferrule that when it is turned into a position substantially at right angles to the handle it will abut squarely against the end of the ferrule—as seen in Fig. 3, for instance. It should be remarked, moreover, that said ferrule extends free of the end of the handle of the implement sufficiently so that however long the pick may be it can be folded back into the ferrule, as indicated by dotted lines in Fig. 3, thus being in the position which it occupies when the implement is to be used as a shovel or spade.

$j$ denotes a sleeve, which is loosely arranged on the ferrule so as to turn thereon and which has a slot $k$, which by turning the sleeve may be brought into coincidence with the slot $d$ of the ferrule. It will be understood that when in this position the combined pick and spade or shovel may be freely turned on its pivot and that when the sleeve is turned so that the slots do not coincide the sleeve either coacts with the ferrule in forming an abutment which engages the combined pick and shovel or spade, as when the parts are in the position shown in full lines in Fig. 3, or acts to maintain the pick inclosed in the ferrule, as shown in dotted lines in said figure. The sleeve has internal threading $l$, which is adapted to engage the threading $e$ of the ferrule, and thus when the parts are in the position shown in full lines in Fig. 3 it may be made to bind firmly against them, and thus obviate any looseness.

In the modification shown in Figs. 4, 5, and 6 the ferrule portion is eliminated, the combined pick and shovel or spade being pivotally arranged in the bifurcated end $m$ of the handle $a$. $n$ is a sleeve which is arranged on the handle so as to loosely turn thereon and which is provided with an obliquely-disposed slot $o$, receiving a screw or other projection $p$ on the handle. By virtue of the slot-and-pin connection between the handle and the sleeve the latter when turned will have a longitudinal movement on the handle and so, as in the case of the sleeve $j$, may be made to bind against the part constituting the pick and shovel or spade when in the position illustrated in Fig. 3 to obviate any looseness of parts. The sleeve $n$ has a slot $q$ corresponding to and having the same function as the slot $k$ of the sleeve $j$.

It will be observed that the part forming the shovel or spade may be made in the form of an adz or hoe or other like tool, if desired.

If desired, the inner edges of the pick and the shank portion of the shovel or spade may be provided with recesses $r$, adapted to receive the end of the sleeve.

Having thus fully described my invention, what I claim as new, and desire to secure by Letters Patent, is—

1. The combination of a handle having a bifurcated portion, a pick pivoted in and adapted to fold into said bifurcated portion, and a sleeve inclosing said bifurcated portion of said handle and having a longitudinal slot extending inwardly from its free end, said sleeve being adapted to turn on the bifurcated portion, substantially as described.

2. The combination of a handle having a bifurcated portion, a pick pivoted in and adapted to fold into said bifurcated portion, and a sleeve inclosing said bifurcated portion of said handle and having a longitudinal slot extending inwardly from its free end, said sleeve being adapted to turn on the bifurcated portion and having a cam-like engagement with the same, substantially as described.

3. The combination of a handle having a bifurcated portion, a combined pick and shovel, spade or other like implement pivoted in said bifurcated portion, the pick part of said implement being adapted to fold into said bifurcated portion, and a sleeve inclosing said bifurcated portion and having a longitudinal slot extending inwardly from its free end, said sleeve being adapted to turn on the bifurcated portion and having a cam-like engagement with the same, substantially as described.

In testimony that I claim the foregoing I have hereunto set my hand this 7th day of December, 1900.

JOSEPH BOIVIN.

Witnesses:
 ALFRED GARTNER,
 JAMES B. NEWTON.